(12) United States Patent
Numata et al.

(10) Patent No.: US 7,884,924 B2
(45) Date of Patent: Feb. 8, 2011

(54) RESIDUAL STRESS MEASURING METHOD AND SYSTEM

(75) Inventors: Shohei Numata, Hitachinaka (JP); Atsushi Baba, Tokai (JP); Tetsuya Matsui, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 217 days.

(21) Appl. No.: 11/935,673

(22) Filed: Nov. 6, 2007

(65) Prior Publication Data

US 2008/0123079 A1    May 29, 2008

(30) Foreign Application Priority Data

Nov. 29, 2006   (JP)   ............... 2006-321877

(51) Int. Cl.
    *G01L 1/24*    (2006.01)
(52) U.S. Cl. ........................... 356/35.5; 356/32
(58) Field of Classification Search .......... 356/32–35.5, 356/216, 432–436, 443–444, 457–458; 73/760, 73/762, 768, 783, 787, 795, 800, 804–806, 73/823
    See application file for complete search history.

(56) References Cited

U.S. PATENT DOCUMENTS

| 5,432,595 | A | 7/1995 | Perchersky |
| 2005/0052637 | A1 * | 3/2005 | Shaw et al. ............... 356/35.5 |

FOREIGN PATENT DOCUMENTS

| JP | 64-016941 | 1/1989 |
| JP | 6-260799 | 9/1994 |
| JP | 7-218449 | 8/1995 |
| JP | 2001-144402 | 5/2001 |
| JP | 2003-514247 | 4/2003 |

OTHER PUBLICATIONS

M. Hayakawa, et al, "Non-destructive Internal Flaw Inspection by Shearography," Inspection Technique, Nippon Kogyo Shuppan, Published Jun. 1, 2004, vol. 9, No. 6, pp. 21-26.
K. Yamada, et al, "Nondestructive Evaluation Method of Welding Residual Stresses by Heating Method," vol. 70, No. 699, (Nov. 2004).
G. Kaufmann, et al, "Measurement of residual stresses using local heating and a radial in-plane speckle interferometer," Optical Engineering vol. 44, (Sep. 2005).
M. Pechersky, "Determination of Residual Stresses by Thermal Relaxation and Speckle Correlation Interferometry," Blackwell Science Ltd. Strain 2002, 38, pp. 141-149.

* cited by examiner

*Primary Examiner*—Gregory J Toatley
*Assistant Examiner*—Tri T Ton
(74) *Attorney, Agent, or Firm*—Brundidge & Stanger, P.C.

(57) ABSTRACT

A residual stress measuring method capable of measuring residual stress of the surface of an object to be inspected rapidly in a non-destructive non-contact manner, as well as a residual stress measuring system having such characteristics and being high in portability, are provided. The residual stress measuring system comprises a heating laser for heating an inspection area of an object to be inspected, a laser interferometer for irradiating the inspection area interferometric with laser light and measuring a deformation quantity within an elastic deformation range upon stress relief by heating in accordance with a laser interferometric method, and a data processor for measuring residual stress from the deformation quantity within the elastic deformation range upon stress relief of the object to be inspected.

14 Claims, 13 Drawing Sheets

RESIDUAL STRESS MEASURING METHOD AND SYSTEM

BACKGROUND OF THE INVENTION

1. Field of the Invention

The present invention relates to a residual stress measuring method and system. More specifically, the present invention is concerned with a residual stress measuring method and system which measures a stress relieved strain of a surface of an object to be inspected in a non-destructive non-contact manner by utilizing the laser interferometry technique.

2. Description of the Related Art

Non-destructive inspection is becoming more and more important in the course of manufacturing a product, and non-destructive inspection techniques for a wide variety of defects have been developed. However, to measure residual stress which exerts a great influence on product life and performance, it is a destructive inspection involving a sampling inspection that is mainly adopted and it is the actual situation that, in the case of a non-destructive inspection, it is necessary to use a large-scaled system and field application of such a large-scaled system has not been made yet.

Residual stress is sure to occur in a process attended with plastic deformation such as a welding process and is now an issue in a wide manufacturing field covering from automobile bodies up to large-sized structures in power plants. In particular, in a nuclear power plant, residual stress of an in-pile structure such as a shroud within a pressure vessel poses a problem.

To measure residual stress, a method is generally adopted wherein stress is relieved for example by perforation and the resulting strain is measured by using a strain gauge. Although this method involves destruction, it is in most practical use because the principle thereof is simple or because it has long been studied and developed. A relation between strain quantity and residual stress value is determined in the following manner. Strain $\epsilon$ induced for example in welding is represented by the sum of elastic strain $\epsilon^e$ and plastic strain $\epsilon^p$ (Equation (1)), while as residual stress $\sigma$, the following equation (2) is established for an isotropic material, assuming that Hooke's Law exists between residual stress $\sigma$ and elastic strain $\epsilon^e$:

$$\epsilon = \epsilon^e + \epsilon^p \quad (1)$$

$$\sigma = E \cdot \epsilon^e \quad (2)$$

where E stands for Young's modulus. Thus, in the stress relieving method, residual stress can be measured directly by multiplying relieved elastic strain by Young's modulus.

On the other hand, in the non-destructive inspection method, an X-ray diffraction method or a neutron diffraction method is utilized. Both methods require a countermeasure to radiation and a large-scaled measuring apparatus, so are less convenient and are mainly utilized on a laboratory level, for example, in sampling inspection. Moreover, a restriction on the apparatus permits measurement of only a small-sized object or makes it impossible to measure an uneven surface. After all, machining is required and it is impossible to effect a complete non-destructive inspection. For a sensor solving these problems and superior in portability, a magnetostrictive method and an acoustoelastic method are now under study, but at present these methods can measure only a principal stress difference and have not been applied yet to actual machines.

Under such circumstances, the development of a residual stress measuring technique as a combination of both stress relieving method and optical interferometric method is recently under way in order to effect simple, rapid and highly reliable residual stress measurement. According to this residual stress measuring technique, strain resulting from stress relief by perforation or by partial relief is measured by a non-contact laser interferometric technique of a high resolution instead of the conventional strain gauge.

ESPI (Electric Speckle Pattern Interferometry) (see, for example, Patent Literature 1) is known as an optical interferometric method. The principle of ESPI is as follows. First, when the surface (rough surface) of an object to be inspected is irradiated with coherent light such as laser light, complicated mutual interference occurs due to scattering and a dotted pattern called speckle pattern is created. This speckle pattern and reference light branched from emitted light are interfered with each other on a photographing plane to effect exposure and two such images are photographed before and after occurrence of a displacement. The two images are then subjected to image processing and a displacement distribution over a wide area is calculated at a time. To calculate such a displacement distribution, for example, Fourier transform method or phase shift method is used and the result is obtained as an interference fringe corresponding to a change in optical path length of objective light caused by occurrence of the displacement. Non-Patent Literature 1 describes about Fourier transform method and phase shift method as related image processing methods in addition to ESPI. According to the technique described therein, a displacement can be measured with fringe sensitivity of about a half wavelength of laser light used.

A shearography method which makes a local displacement easier to see by the application of ESPI (see, for example, Non-Patent Literature 1) is known as a further optical interferometric method. According to this method, a speckle pattern reflected from an area to be inspected is divided into two by a light splitter installed ahead of an image pickup device, then the thus-divided two reflected images are slightly dislocated in the surface direction of the object to be inspected and are photographed by an image pickup device such as CCD. By double exposure in the image pickup device the picked-up reflected images become differential images. Further, since laser light is highly interferential, the two images subjected to the double exposure interfere with each other and the double-exposed pattern becomes an interference pattern. By performing this operation twice in the course of a change of an external stress, a change with time of a differential value of strain induced by the external stress is obtained as a phase change of the interference pattern. Consequently, a very small surface strain at the wavelength level of the laser light used is measured. The shearography method is characteristic in that a low frequency strain induced by an external stress such as heat is removed by the differential image and only a local strain can be made into an image.

Examples of a stress relieving method include the method wherein stress is relieved by perforation or by partial relief. According to the method, a great destruction occurs and thus it is difficult to apply this method to a completed product or to a structure which is in operation. For this reason, studies have recently been made also about other methods.

In connection with the relief of stress, firstly a large current pulse is directly exerted on an object to be inspected to relieve stress (see, for example, Patent Literature 2), secondly the object to be inspected is heated to relieve stress (see, for example, Non-Patent Literatures 2 and 3), and thirdly the object to be inspected is heated with laser light to relieve stress (see, for example, Patent Literature 3).

[Patent Literature 1]
    JP-A-7-218449

[Patent Literature 2]
    Published Japanese Translation No. 2003-514247 of Unexamined PCT Appln.

[Patent Literature 3]
    U.S. Pat. No. 5,432,595

[Non-Patent Literature 1]
    Mineyuki HAYAKAWA, "Non-destructive Internal Flaw Inspection by Shearography," Inspection Technique, Nippon Kogyo Shuppan, Published Jun. 1, 2004, Vol. 9, No. 6, pp. 21-26

[Non-Patent Literature 2]
    Katsunori YAMADA, "Non-destructive Evaluation of Residual Stress in Welding by Heating Method," Japan Machinery Society Transactions, Chapter A, Vol. 70, No. 699, (2004. 11)

[Non-Patent Literature 3]
    G. H. Kaufmann, "Measurement of residual stresses using Local heating and a radial in-plane speckle Interferometer," SAE Optical Engineering 44 (2005. 9)

SUMMARY OF THE INVENTION

The conventional stress relieving method as a conventional residual stress measuring method involves the problem that destruction such as perforation occurs and the measurement time is long. Moreover, the conventional non-destructive method involves the problem that X-ray diffraction and neutron diffraction require a large-scale equipment and are poor in portability and also long in measurement time.

Further, it cannot be said that the method described in Patent Literature 2 is a non-destructive method, because a plastic deformation is induced by heating and the amount of deformation after cooling is measured. Such a method can be regarded as a destructive method. Also in the methods described in Non-Patent Literatures 2, 3 and Patent Literature 3, a plastic deformation is induced by heating and thus those methods cannot be regarded as non-destructive methods, but can rather be regarded as destructive methods.

In connection with a residual stress measuring method for measuring residual stress of the surface of an object to be inspected, it is an object of the present invention to provide a rapid, highly portable, residual stress measuring method and system capable of measuring residual stress in a non-destructive non-contact manner.

(1) To achieve the above-mentioned object, in one aspect of the present invention, there is provided a residual stress measuring method for measuring residual stress of the surface of an object to be inspected, the method comprising the steps of heating an inspection area on the surface of the object to be inspected, irradiating the inspection area with laser light for interferometry, measuring a deformation quantity within an elastic deformation range upon stress relief by heating in accordance with a laser interferometric method, and measuring residual stress from the deformation quantity within the elastic deformation range upon stress relief of the object to be inspected.

According to this method, it is possible to measure residual stress in a non-destructive non-contact manner and thus this method permits rapid measurement and a highly portable construction.

(2) In the above method (1), preferably, when measuring residual stress from the deformation quantity within the elastic deformation range, a deformation quantity induced by a thermal strain resulting from heating is subtracted from the total deformation quantity resulting from heating to determine a deformation quantity based on stress relief and residual stress is measured from the deformation quantity thus determined.

(3) In the above method (2), preferably, the aforesaid deformation quantity induced by a thermal strain resulting from heating is determined beforehand from a thermal distribution obtained upon heating of the same material as the object to be inspected.

(4) In the above method (2), preferably, when the object to be inspected has a strain induced by stress in the measurement direction and there is no stress-induced strain in a direction orthogonal to the measurement direction, the deformation quantity induced by a thermal strain resulting from heating is determined by measuring a deformation quantity in the measurement direction of the object to be inspected and that in a direction orthogonal thereto by the laser interferometric method and then using the quantity measured in the orthogonal direction.

(5) In the above method (2), preferably, the deformation quantity induced by a thermal strain resulting from heating is determined by heating a reference member which is of the same material as that of the object to be inspected and which is free of residual stress.

(6) In the above method (1), preferably, an electronic speckle pattern interferometric method is used as the laser interferometric method.

(7) In the above method (1), preferably, a laser shearography method is used as the laser interferometric method.

(8) In the above method (1), preferably, the heating means is laser heating means.

(9) In the above method (1), preferably, the shape of the heating portion in the surface inspection area is a linear shape.

(10) In the above method (1), preferably, the shape of the heating portion in the surface inspection area is a divided linear shape.

(11) In the above method (1), preferably, measurement is made before and after a residual stress relaxing process and a residual stress relaxing effect is determined from the difference between measurement results before and after the residual stress relaxing process.

(12) In the above method (1), preferably, a change in temperature caused by heating is measured simultaneously with heating by an infrared imaging apparatus.

(13) In the above method (12), preferably, strain is measured simultaneously with heating and residual stress is measured from a change of the strain relative to temperature.

(14) To achieve the foregoing object, in another aspect of the present invention, there is provided a residual stress measuring system for measuring residual stress of the surface of an object to be inspected, the system comprising laser heating means for heating a surface inspection area, interferometric laser light irradiating the inspection area means for irradiating with laser light for interferometry and measuring a deformation quantity within an elastic deformation range upon stress relief by heating in accordance with a laser interferometric method, and data processing means for measuring residual stress from the deformation quantity within the elastic deformation range upon stress relief of the object to be inspected.

According to the above constructions, it is possible to effect residual stress measurement in a non-destructive non-contact manner and both rapidness and high portability can be attained.

Thus, according to the present invention, in the residual stress measuring method for measuring residual stress of the surface of an object to be inspected, not only residual stress measurement can be made in a non-destructive non-contact manner, but also rapidness and high portability can be attained.

BRIEF DESCRIPTION OF THE DRAWINGS

FIGS. 8A1 to 8A3 and 8B1 to 8B3 are diagrams explanatory of the shapes of heating areas to be heated by a heating laser which is used in the residual stress measuring system according to the second embodiment;

DETAILED DESCRIPTION OF PREFERRED EMBODIMENTS

With reference to FIGS. 1 to 5, a description will be given below about the construction and operation of a residual stress measuring system according to a first embodiment of the present invention.

First, with reference to FIG. 1, the construction of the residual stress measuring system of this embodiment will be described.

Figure 1:
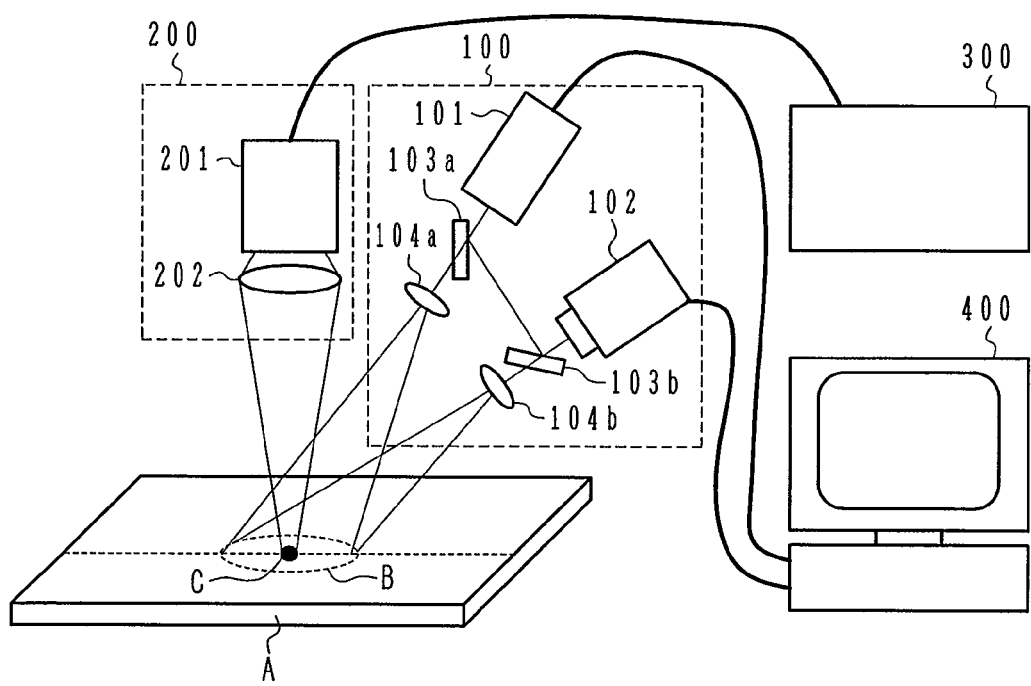
FIG. 1 is a construction diagram of a residual stress measuring system according to a first embodiment of the present invention.

FIG. 1 is a construction diagram of the residual stress measuring system of the first embodiment.

The residual stress measuring system of the first embodiment includes a laser interferometer 100, a heating laser apparatus 200, a controller 300 and a data processor 400. The laser interferometer 100 includes a laser 101 for irradiating with laser light a surface inspection area B of an object A to be inspected and a light receiving device 102 such as a CCD camera for receiving and recording reflected interference light and reference light, an interference optical system 103, and a magnifying/condensing optical system 104. The heating laser apparatus 200 includes a laser 201 for irradiating with laser light a heating area C on the surface of the object A to be inspected and a condensing optical system 202. The relation between the inspection area B and the heating area C may be such that both are coincident with each other or are dislocated from each other, or one includes the other completely. The inspection area B may be one point. However, it is difficult to chase one point because the position thereof moves in a three-dimensional manner due to thermal strain or stress-relieved strain, so that ESPI is mainly used as a laser interferometric method and a certain range is used as an inspection area. The ESPI method utilizes a speckle pattern which is formed by irregular reflection on a rough surface of diffused laser light, whereby it is possible to measure a deformation in a wide range of area.

Next, with reference to FIG. 2, a description will be given below about a residual stress measuring method using the residual stress measuring system according to this first embodiment.

Figure 2:
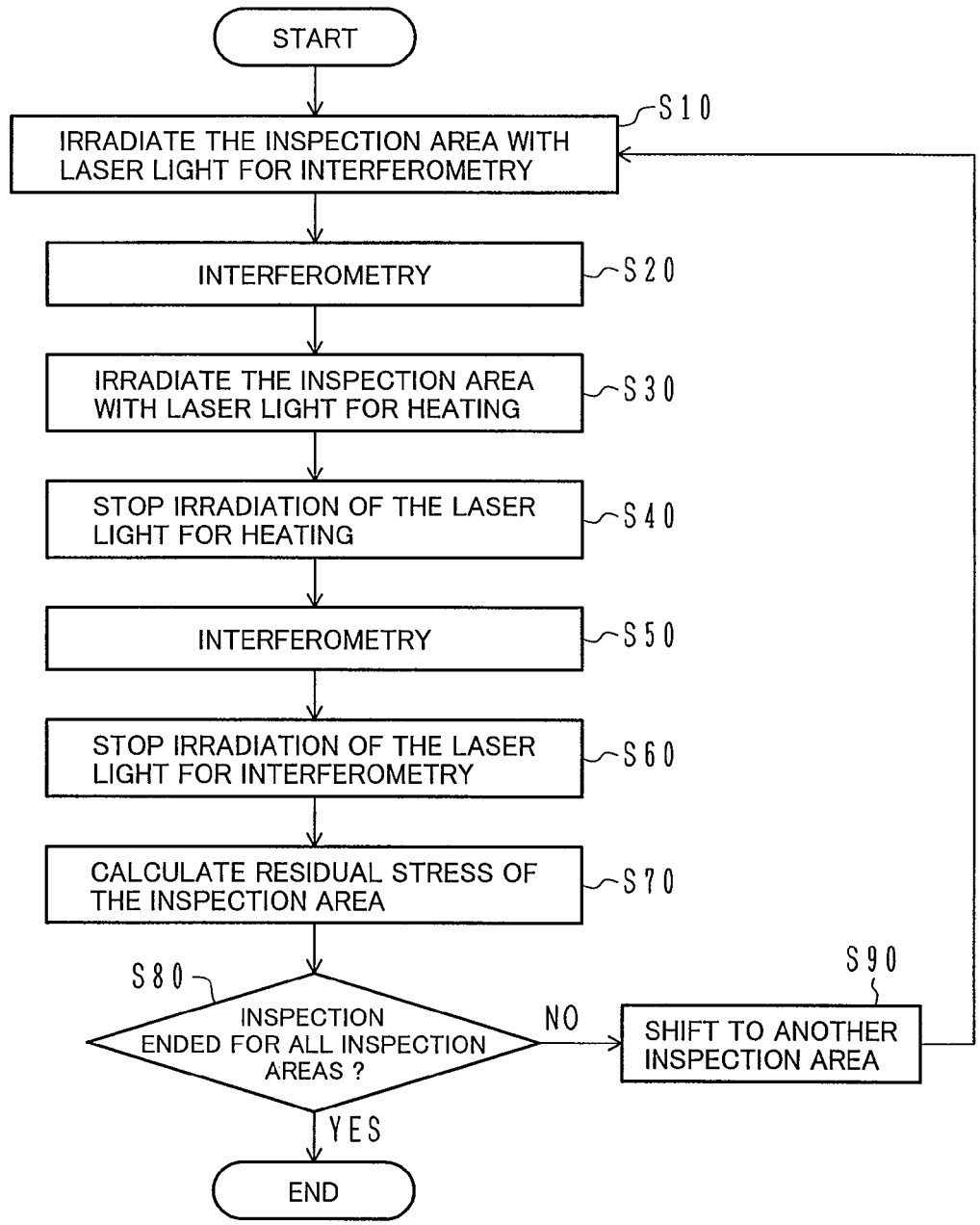
FIG. 2 is a flow chart showing residual stress measuring steps in a residual stress measuring method using the residual stress measuring system according to the first embodiment.

FIG. 2 is a flow chart showing residual stress measuring steps in the residual stress measuring method.

In step S10, the laser interferometer 100 irradiates the inspection area with B laser light for interferometry and then, in step S20, performs interferometer of the inspection area B.

Next, in step S30, the controller 300 controls the heating laser apparatus 200 with such an output as permits heating of the heating area C up to a predetermined temperature within a predetermined time. At this time, the heating temperature is determined in such a manner that the resulting elastic deformation falls under a range not larger than a yield stress by making reference to data of the yield stress which is determined by the material of the object A to be inspected. The elastic deformation range indicates a range in which a deformation inducing stress does not exceed the yield stress at the temperature of the heated part. The heating temperature and the yield stress are in a relation such that when the heating temperature increases, the yield stress decreases. Therefore, on the basis of the relation between the heating temperature and the yield stress, it is possible to determine such a heating temperature (e.g., 300° C.) as is not higher than the yield stress. It is preferable that the heating temperature be the highest temperature in the elastic deformation range, whereby the difference between the deformation quantity before heating and that after heating can be made large. In case of measuring a surface residual stress, the shorter the predetermined time, the better. More particularly, the predetermined time is within one second or several seconds at most, although it also depends on the depth of the inspection area.

Then, in step S40, after the temperature of the inspection area has risen to the predetermined temperature, the controller 300 terminates the heating by the heating laser apparatus 200. Immediately thereafter, in step S50, the laser interferometer 100 performs interferometry of the inspection area B.

Next, in step S60, the radiation of the laser light for interferometry by the laser interferometer 100 is stopped.

Then, in step S70, the data processor 400 calculates the total deformation quantity from an interferometric difference of the inspection area position measured in steps S20 and S50. Further, the data processor 400 subtracts a thermal strain-induced deformation quantity from the total deformation quantity and calculates a deformation quantity induced by residual stress. According to Hooke's Law, the deformation quantity induced by residual stress is determined by the product of the difference in Young's modulus between before and after heating and the residual stress. Thus, the value of residual stress is determined eventually. Concrete examples of step S70 will be described in detail later with reference to FIGS. 3A and 3B and subsequent figures.

Next, in step S80, if the inspection area is not a single area, a check is made to see if the inspection has been completed over the whole range. If the answer is negative, then in step S90, the same measurement is performed for the next inspection area.

Now, with reference to FIGS. 3A and 3B, a description will be given below about a first concrete example of how to determine residual stress with use of the residual stress measuring system of this first embodiment.

Figure 3A:
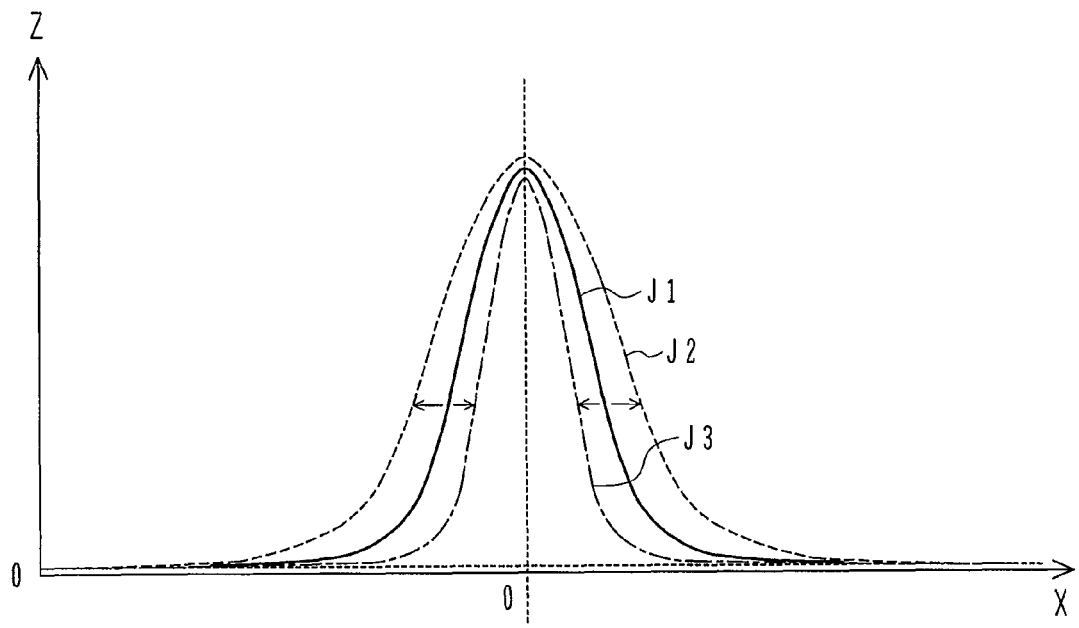
FIGS. 3A and 3B are explanatory diagrams of a first concrete example of how to determine residual stress with use of the residual stress measuring system according to the first embodiment.
Figure 3B:
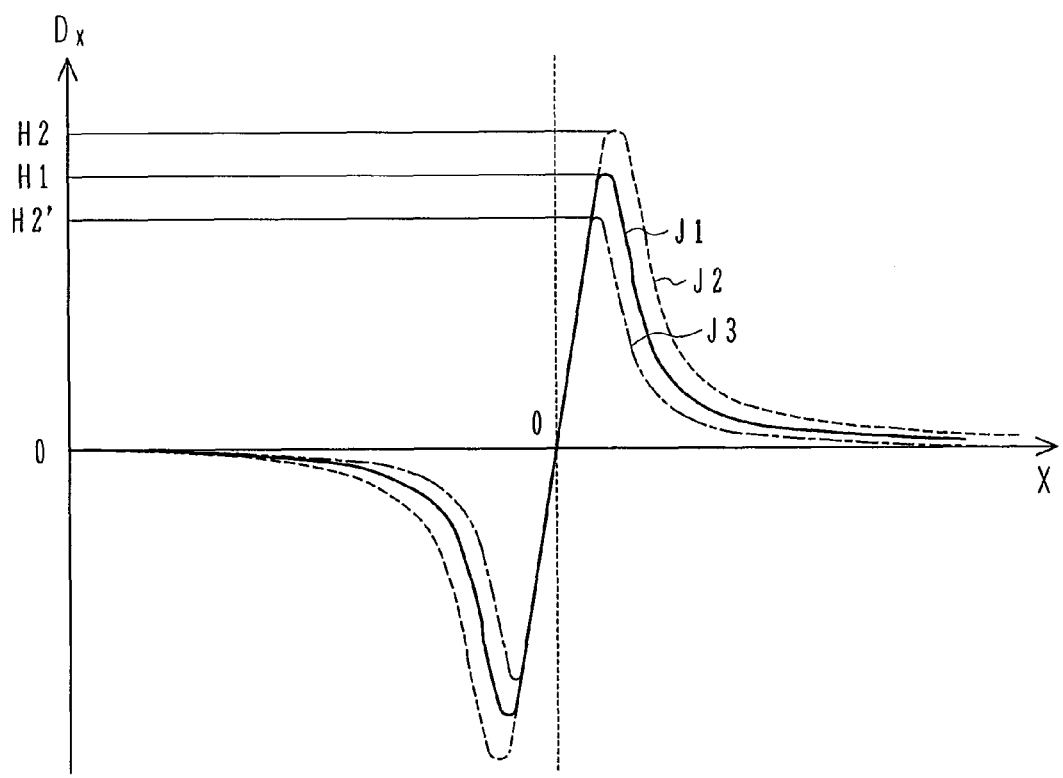

FIGS. 3A and 3B are diagrams explanatory of a first concrete example of a residual stress measuring method using the residual stress measuring system of this first embodiment.

FIGS. 3A and 3B show the results of interferometry of the inspection area position measured in steps S20 and S50 both shown in FIG. 2. FIG. 3A shows a deformation quantity in Z direction of the object to be inspected resulting from heating and FIG. 3B shows a deformation quantity in X direction of the surface of the object to be inspected resulting from heating.

In FIG. 3A, the position in X direction of the inspection area is plotted along the axis of abscissa while the height in Z direction, i.e., displacement, is plotted along the axis of ordinate. The X=0 position in X direction is assumed to be the center of the heating area C. In FIG. 3B, the position in X direction of the inspection area is plotted along the axis of abscissa, while displacement Dx is plotted along the axis of ordinate. The deformation quantity is larger in X direction (FIG. 3B) than in Z direction (FIG. 3A) and therefore the deformation in X direction shown in FIG. 3B will be described below.

For example, in the measurement result obtained in step S20 before heating, Dx is assumed to be 0. On the other hand, in the measurement result obtained in step S50 after heating, there was observed such a deformation as indicated by a broken line J2 and the maximum deformation value is H2. As noted earlier, the total deformation quantity is the sum of the deformation quantity induced by thermal strain and the deformation quantity induced by residual stress. In the figure, a solid line J1 indicates the deformation quantity induced by thermal strain. The maximum value of the deformation quantity induced by thermal strain is assumed to be H1. Consequently, the deformation quantity induced by residual stress is calculated as (H2−H1).

The deformation quantity H1 induced by thermal strain is determined in the following manner. In step S30 shown in FIG. 2, if the heating area C is heated to a predetermined temperature (e.g., 300° C.) in a predetermined time (e.g., 1 second), the surface of the heating area C is 300° C., but the same area has such a temperature distribution as becomes lower in temperature toward the interior. This temperature distribution can be determined by using a test piece or the like made of the same material and having the same thickness as the object A to be inspected and by heating it under the same heating conditions as in step S20. Using this temperature distribution, it is possible to calculate beforehand the deformation quantity induced by thermal strain for the whole of the object A when heated so as to have the temperature distribution.

As noted earlier, the deformation quantity (residual stress relieved strain) $\epsilon^e$ induced by residual stress is (H2−H1)/D where D stands for the width of the heating area. The residual stress σ can be represented by the following equation (3):

$$\sigma = E_1 \cdot (\varepsilon_0 + \varepsilon^e) \quad (3)$$
$$= E_0 \cdot \varepsilon_0$$
$$= E_1 / (1 - E_1/E_0) \cdot \varepsilon^e$$
$$= E_1 / (1 - E_1/E_0) \cdot ((H2 - H1)/D)$$

Where $E_0$ is young's modulus before heating, $E_1$ is Young's modulus after heating, and $\epsilon_0$ is residual strain. The residual stress σ can be calculated by the equation (3).

The above description is of the case where the residual stress is a tensile stress. On the other hand, in case of the residual stress being a compressive stress, the deformation quantity after heating is as indicated by a dash-dot line J3 in FIGS. 3A and 3B. Given that the maximum value of deformation quantity at that time is H2', the deformation quantity induced by residual stress can be calculated as (H1−H2').

Next, with reference to FIGS. 4, 5A and 5B, a description will be given below about a second concrete example of how to determine residual stress with use of the residual stress measuring apparatus of this first embodiment.

Figure 4:
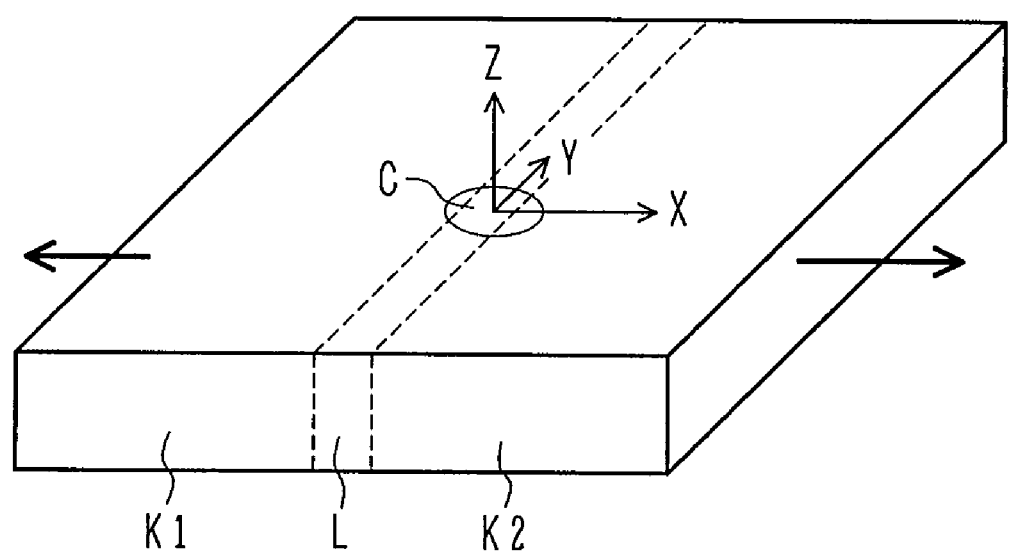
FIG. 4 is an explanatory diagram of a second concrete example of how to determine residual stress with use of the residual stress measuring system according to the first embodiment.
Figure 5A:
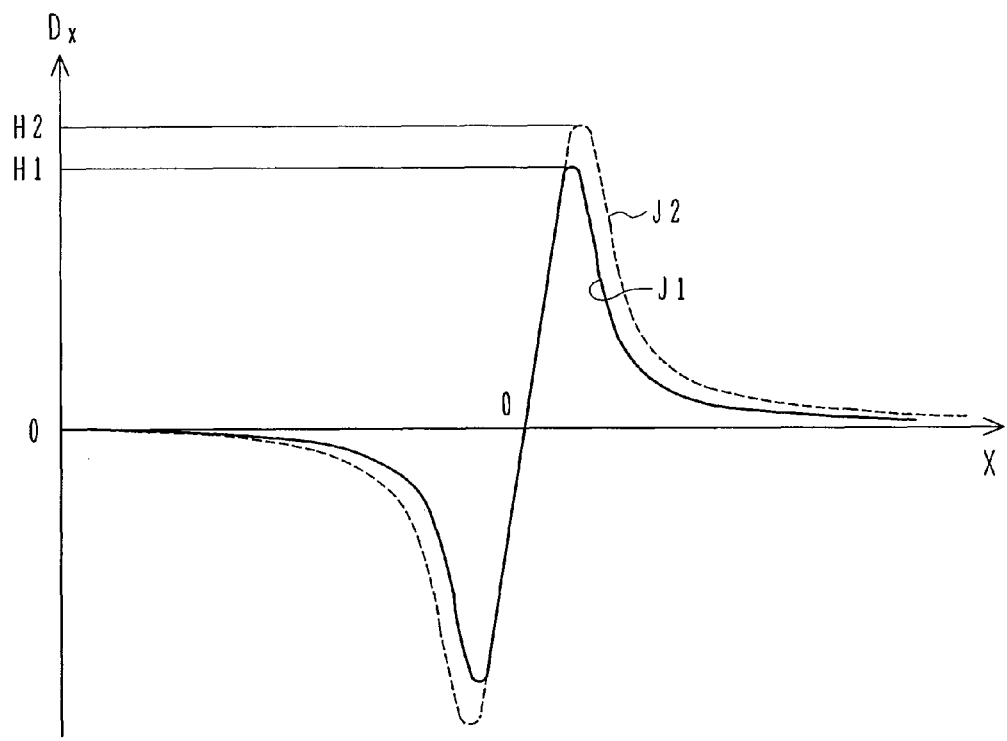
FIGS. 5A and 5B are explanatory diagrams of the second concrete example of how to determine residual stress with use of the residual stress measuring system according to the first embodiment.
Figure 5B:
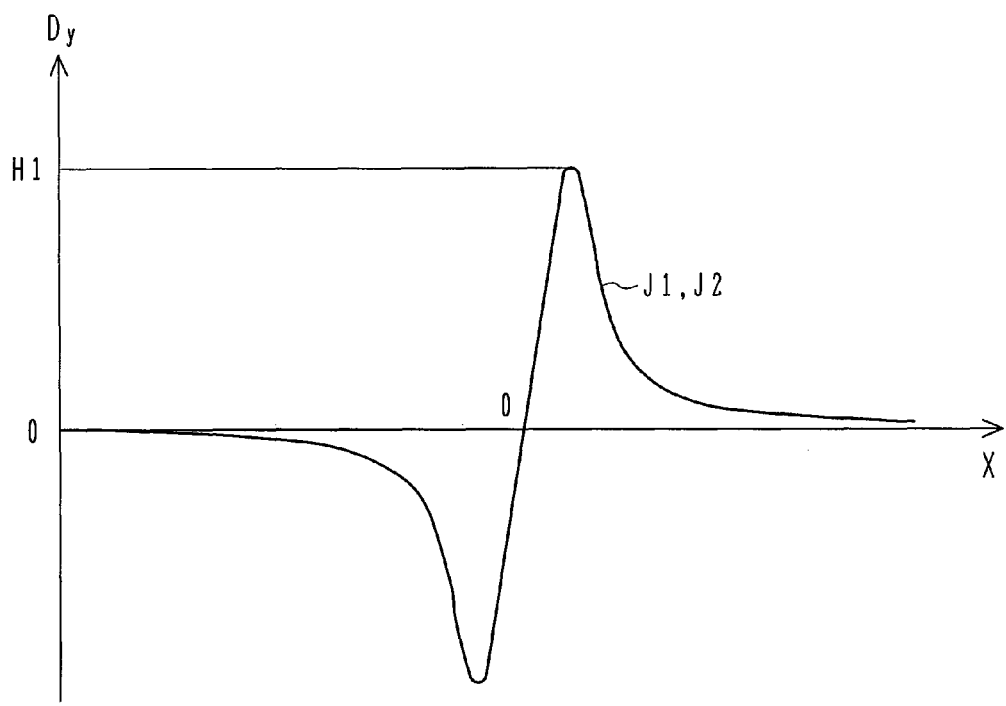

FIGS. 4, 5A and 5B are diagrams explanatory of a second concrete example of a residual stress measuring method using the residual stress measuring system of this first embodiment.

FIG. 4 shows a structure wherein a first plane member K1 and a second plane member K2 are welded together at a weld zone L. This is also true of the case where two cylindrical pipes, instead of the plane members, are welded together at respective end faces. As shown in FIG. 4, the weld zone L extends in Y direction.

In FIG. 5A, the position in X direction of the inspection area is plotted along the axis of abscissa, while displacement Dx in X direction is plotted along the axis of ordinate. In FIG. 5B, the position in Y direction of the inspection area is plotted along the axis of abscissa, while displacement Dy in Y direction is plotted along the axis of ordinate.

In FIG. 5A, as in FIG. 3B, in the measurement result obtained in step S20 before heating, Dx is 0. On the other hand, in the measurement result obtained in step S50 after heating, such a deformation as indicated by a broken line J2 is observed and the maximum value of deformation quantity is H2. As described above, the total deformation quantity is the sum of the deformation quantity induced by thermal strain and the deformation quantity induced by residual stress. In the figure, the deformation indicated by a solid line J1 represents the deformation quantity induced by thermal strain. The maximum value of the deformation quantity induced by thermal strain is assumed to be H1.

On the other hand, in FIG. 5B, for example in the measurement result obtained in step S20 before heating, Dy is 0, while in the measurement result obtained in step S50 after heating, such a deformation as indicated by broken lines J1 and J2 are observed and the maximum value of deformation quantity is H1. Y direction as referred to herein indicates the direction of the weld zone L, as described above in connection with FIG. 4.

In such a welded structure as shown in FIG. 4, residual stress in welding occurs in X direction, but does not occur in Y direction. Therefore, the maximum value H1 of deformation quantity after heating shown in FIG. 5B all becomes the deformation quantity induced by thermal strain. Therefore, the deformation quantity induced by residual strain can be calculated as (H2−H1) from the deformation quantity H2 in X direction and the deformation quantity H1 in Y direction.

Thus, when there is residual stress in a certain direction and there is no residual stress in a direction orthogonal thereto, it is unnecessary in this example to determine a heat distribution of the structure and calculate a thermal strain quantity on the basis of the value obtained. The deformation quantity based on a residual stress-induced strain can also be obtained by determining a thermal strain-induced deformation quantity H1 beforehand with respect to a reference member made of the same material as the object to be inspected and free of residual stress, and then on the basis of the difference from the deformation quantity H2 obtained in measurement of the object to be inspected.

In the above description given in connection with FIG. 2, heating and interferometry are explained dividedly from each other. However, since the heating uses laser light, if colors not overlapping each other, for example red and green, are selected as wavelengths of the heating laser light and the laser light for interferometry, it is possible to effect interferometry simultaneously with heating and hence it becomes possible to make a residual stress measurement up to the boundary of a shift from the elastic deformation range to the plastic deformation range.

According to this first embodiment, as described above, heating up to the highest temperature in the elastic deformation range with laser light, it is possible to make a non-destructive measurement without leaving any flaw or trace.

Moreover, a non-contact residual stress measurement can be done by interferometry.

Thus, the residual stress measuring system of this first embodiment is small-sized, superior in portability, and permits measurement of residual stress even when the object to be inspected is large-sized or is difficult to move wholly or partially.

Next, with reference to FIGS. 6 to 10, a description will be given below about the construction and operation of a residual stress measuring system according to a second embodiment of the present invention.

First, the construction of the residual stress measuring system of this second embodiment will be described with reference to FIG. 6.

Figure 6:
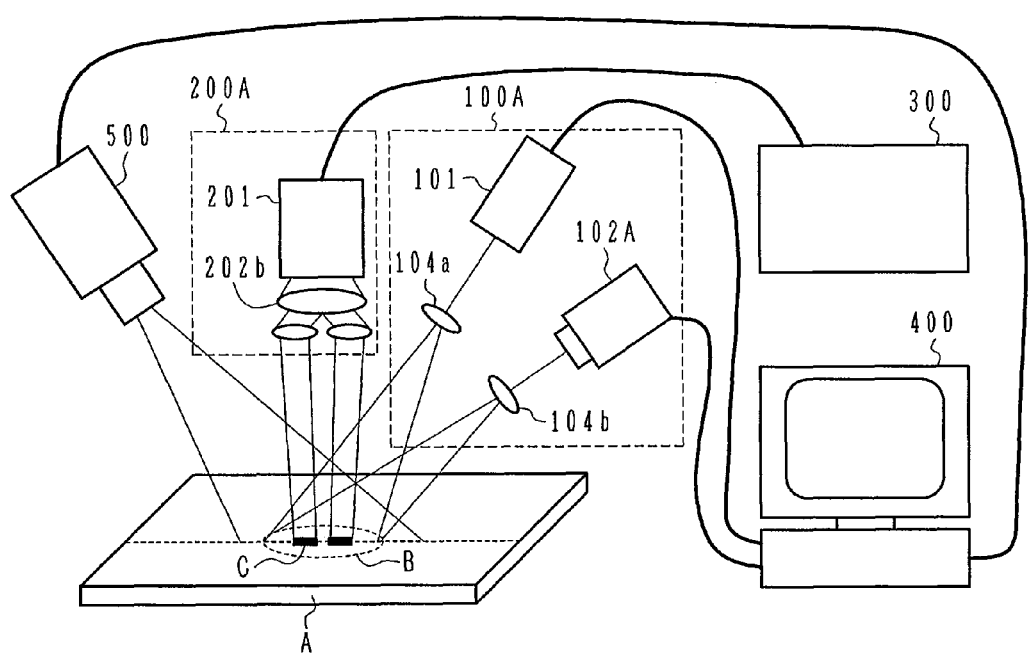
FIG. 6 is a construction diagram of a residual stress measuring system according to a second embodiment of the present invention.

FIG. 6 is a construction diagram of the residual stress measuring system of this second embodiment. In the same figure, the same reference numerals as in FIG. 1 represent the same portions as in FIG. 6.

The residual stress measuring system of this second embodiment includes a temperature measuring device 500 for measuring the temperature of an object A to be inspected, that of an inspection area B and ambient temperature, in addition to a laser interferometer 100A, a heating leaser apparatus 200A, a controller 300 and a data processor 400.

The laser interferometer 100A includes a light receiving device 102A with an interference optical system based on shearography method instead of the interference optical system 103 shown in FIG. 1.

Figure 7A:
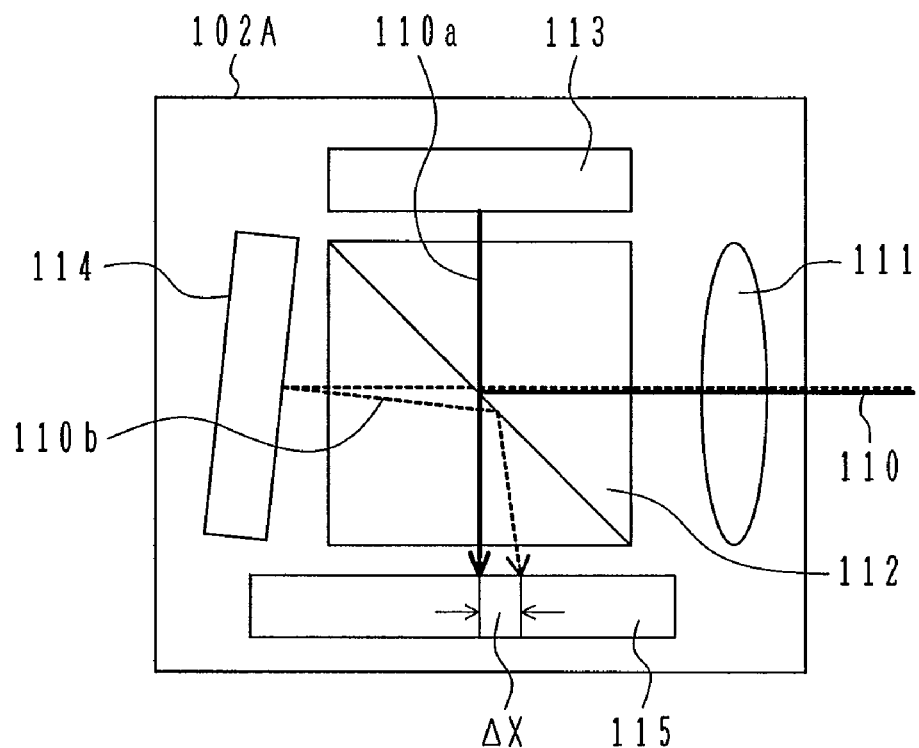
FIGS. 7A and 7B are construction diagrams of a light receiving apparatus with an optical system used in the residual stress measuring system according to the second embodiment.
Figure 7B:
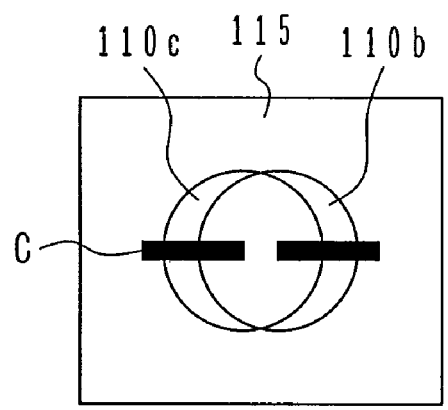
Figure 8:
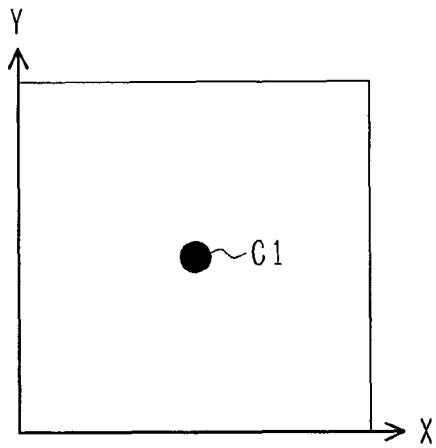
Figure 8:
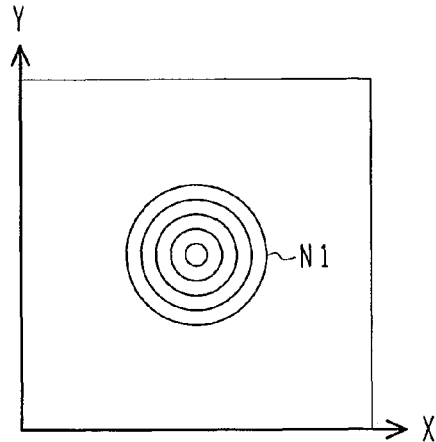
Figure 8:
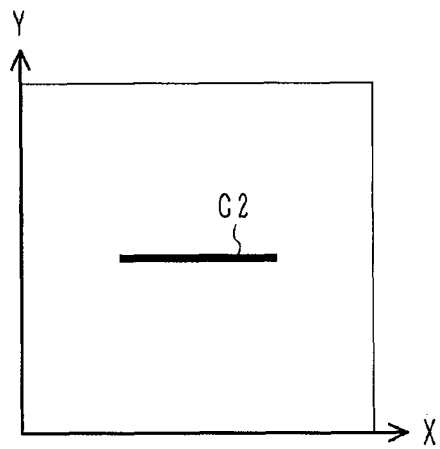
Figure 8:
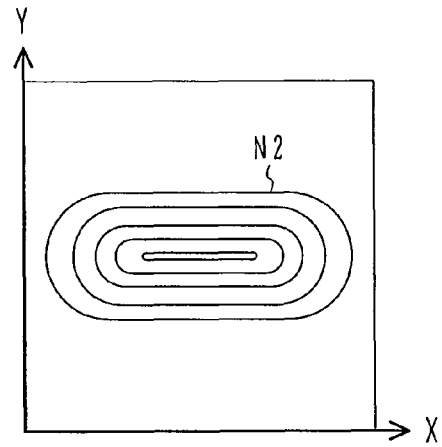
Figure 8:
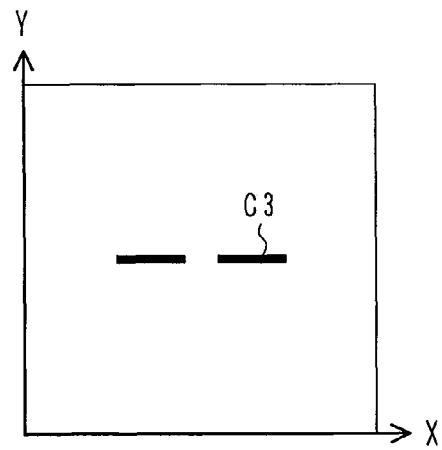
Figure 8:
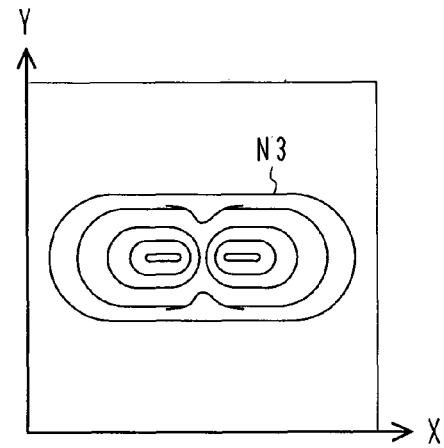

Now, with reference to FIGS. 7A and 7B, the following description is provided about the construction of the light receiving device 102A with the interference optical system used in the residual stress measuring system of this second embodiment.

FIGS. 7A and 7B are construction diagrams of the light receiving system with the interference optical system used in the residual stress measuring system of this second embodiment.

A description will be given below about the optical system used in the light receiving device 102A and the shearography method for the optical system.

As shown in FIG. 7A, the light receiving device 102A is made up of a condenser lens 111, a light splitter 112, a first reflecting mirror 113, a second reflecting mirror 114, and an image measuring element 115. The condenser lens 111 converges a reflected image (speckle pattern) provided from the inspection area B. The light splitter 112 branches the reflected image 110 converged by the condenser lens 111 into two reflected images 110a and 110b. The first reflecting mirror 113 reflects one reflected image 110a out of the two reflected images branched by the light splitter 112. The second reflecting mirror 114 reflects the other reflected image 110b. The image measuring element 115 receives the two reflected images 110a and 110b reflected by the first and second reflecting mirrors 113, 114.

The first reflecting mirror 113 is installed approximately perpendicularly to the optical axis so that one reflected image 110a is incident on a substantially central area of the image measuring element 115. On the other hand, the second reflecting mirror 114 is installed in a somewhat inclined state relative to the optical axis so that the other reflected image 110b is incident on a position somewhat distant from the incident position of the one reflected image 110a on the light receiving surface of the image measuring element 115.

Thus, as schematically shown in FIG. 7B, a differential image obtained by interference of the two reflected images 110a and 110b is incident on the light receiving surface of the image measuring element 115. A differential width of the differential image is determined by a discrepancy quantity ΔX between the reflected light 110a and like light 110b. A local deformation of the inspection area B is emphasized by an optical differentiation and the residual stress measuring accuracy is improved.

Next, with reference to FIGS. 8A1 to 8A3 and 8B1 to 8B3, a description will be given below about the shape of a heating area C which is heated by the heating laser apparatus 200A used in the residual stress measuring system of this second embodiment.

FIGS. 8A1 to 8A3 and 8B1 to 8B3 are diagrams explanatory of the shapes of a heating area which is heated by the heating laser apparatus used in the residual stress measuring system of this second embodiment.

The heating laser apparatus 200A shown in FIG. 6 is provided with an optical system 202b capable of making irradiation so as to create a linear or divided linear shape as the shape of the heating area C.

FIGS. 8A1, 8A2 and 8A3 show shapes C1, C2 and C3 of the heating area C. FIGS. 8B1, 8B2 and 8B3 show temperature distribution contour lines N1, N2 and N3 for the shapes C1, C2 and C3, respectively, of the heating area C in FIGS. 8A1, 8A2 and 8A3.

In the case where the shape of the heating area C is an isotropic (circular) shape C1 as shown in FIG. 8A1, the temperature distribution is also isotropic as shown in FIG. 8B1, and since this shape undergoes the influence of residual stress in X direction and that in Y direction at a time, the difference (principal stress difference) between the two is displayed.

In the case where the shape of the heating area C is a linear shape C2 as shown in FIG. 8A2, a temperature distribution area in Y direction is narrow and a high temperature area is long in X direction, as shown in FIG. 8B2, so that the residual stress-induced strain in X direction is integrated and consequently the residual stress in X direction can be measured with high accuracy.

Further, in the case where the shape of the heating area C is such a divided linear shape C3 as shown in FIG. 8A3, such a temperature distribution as shown in FIG. 8B3 is obtained and the influence in Y direction is further reduced in the unheated area between the divided lines, thus permitting accurate measurement of the residual stress in X direction. Such a division of a line takes effect also for a strain change quantity induced by residual stress under heating in the same heating volume.

Next, with reference to FIG. 9, a description will be given about a difference (maximum strain difference) between maximum and minimum values of an in-plane strain induced by residual stress in the residual stress measuring system of this embodiment.

Figure 9:
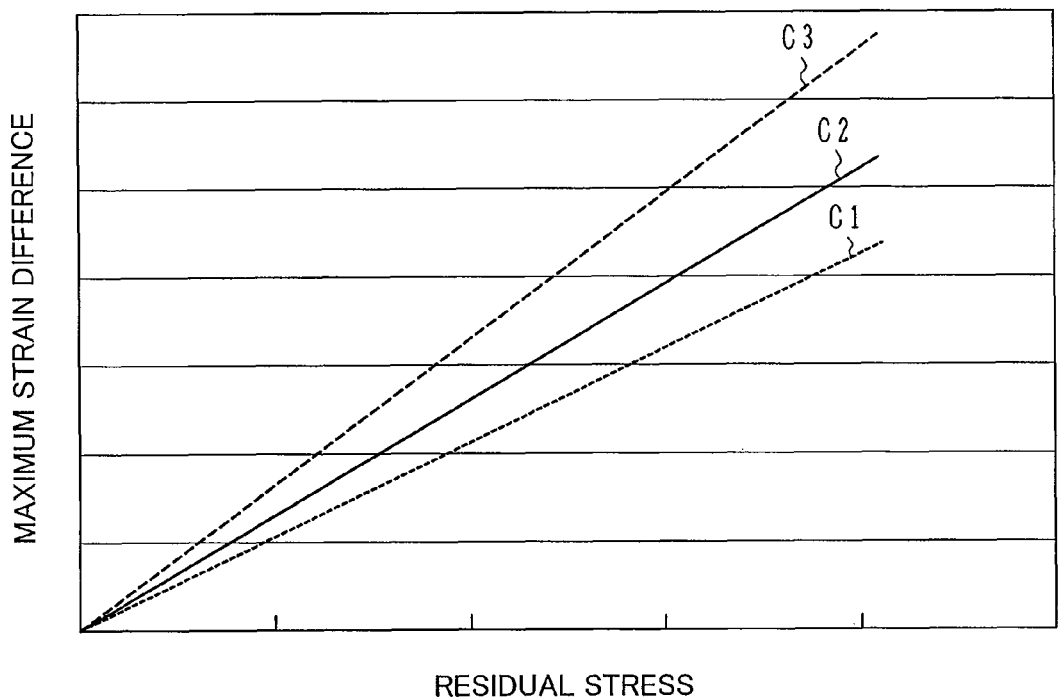
FIG. 9 is an explanatory diagram of the difference between maximum and minimum values of an in-plane strain induced by residual stress in the residual stress measuring system according to the second embodiment.

FIG. 9 is a diagram explanatory of a difference between maximum and minimum values of an in-plane strain induced by residual stress in the residual stress measuring system of this second embodiment.

It is seen that, in all of the illustrated examples, the difference in question is proportional to residual stress, but that maximum strain difference is larger in the case of the divided linear heating C3 shown in FIG. 8A than in the case of the linear heating C2. Generally, the maximum strain difference based on residual stress depends on the ratio of a change in Young's modulus caused by temperature after heating, so that the higher the temperature, the larger the maximum strain difference. In case of the heating temperature being about 75% of C3, even in the same divided linear heating, C3 exhibits a maximum strain difference about 1.5 times as large as that of C1. On the other hand, the divided linear heating C3 is about 1.25 times or more in maximum strain difference as large as the linear heating C2 despite the same temperature. It can be said that this is an outstanding effect.

Although, in this embodiment, strain is measured by the Shearography method to determine residual stress for linear heating and divided linear heating, the above effect can be obtained also by the adoption of ESPI or any other laser interferometry.

Figure 10:
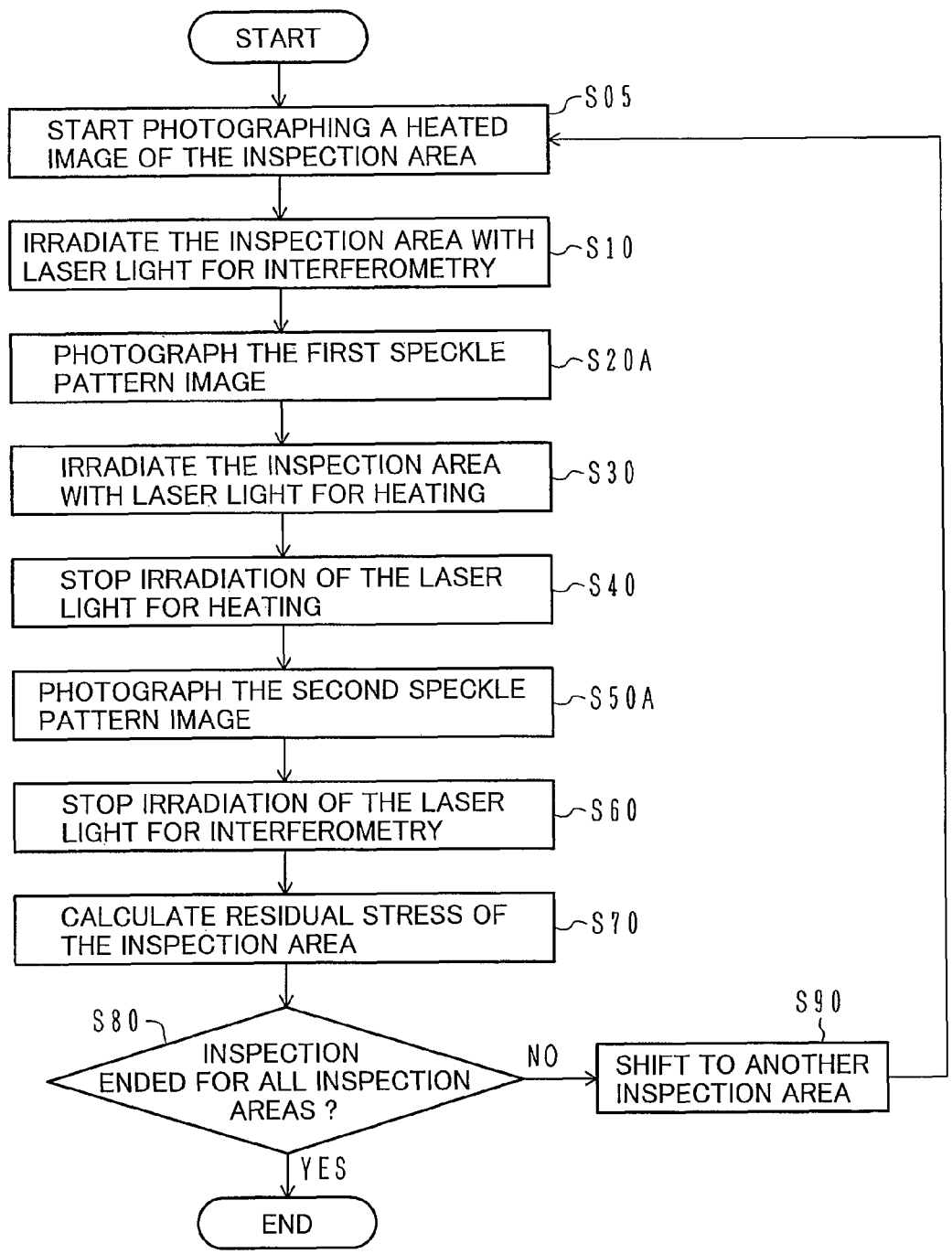
FIG. 10 is a flow chart showing residual stress measuring steps in a residual stress measuring method using the residual stress measuring system according to the second embodiment.

Now, with reference to FIG. 10, the following description is provided about a residual stress measuring method using the residual stress measuring system according to the present invention.

FIG. 10 is a flow chart showing residual stress measuring steps in the residual stress measuring method using the residual stress measuring system according to the present invention.

First, in step S05, the temperature measuring device 500 starts measuring the temperature of the inspection area B.

Next, in step S10, the laser interferometer 100A irradiates the inspection area B with laser light for interferometry, then in step S20A, interferometry is performed and a first speckle pattern image of the inspection area is photographed.

Then, in step S30, the controller 300 drives the leaser laser apparatus 200A with such an output as permits heating the heating area C up to a predetermined temperature within a predetermined time. At this time, the heating temperature is determined in such a manner that the resulting elastic deformation falls under a range not larger than a yield stress by making reference to data of the yield stress which is determined by the material of the object A to be inspected.

Next, in step S40, the controller 300 terminates the heating operation of the heating laser apparatus 200A after the temperature of the inspection area has risen to the predetermined temperature. At this time, the controller 300 takes in a temperature change in real time from the temperature measuring device 500, then makes reference to the data on yield stress which is determined by the material of the object A to be inspected, and stops the emission of the heating laser light upon arrival at a certain preset temperature within the elastic deformation range. Immediately thereafter, in step S50A, the laser interferometer 100A performs interferometry and photographs a second speckle pattern image of the inspection area.

Further, in step S60, the controller 300 stops the emission of the laser light for interferometry by the laser interferometer 100A.

Next, in step S70, the data processor 400 calculates a total deformation quantity from the difference between the interferometric value of the inspection area position measured in step S20A and that measured in step S50A, then subtracts the deformation quantity induced by thermal strain from the total deformation quantity and calculates a deformation quantity induced by residual stress. Since the deformation quantity induced by residual stress is determined by the product of the difference between Young's modulus before heating and that after heating and the residual stress in accordance with Hooke's Law, the value of residual stress eventually is obtained. For a concrete example of step S70, a detailed description will be given with reference to FIGS. 3A and 3B and subsequent figures.

Next, in step S80, if the inspection area is not a single area, a check is made to see if the measurement is over for all of the inspection areas. If the answer is negative, then in step S90, the same measurement is made for the next inspection area.

In the description given above in connection with FIG. 10, heating and interferometry are divided from each other. Since the heating uses laser light, however, if colors not overlapping each other, for example red and green, are selected as the wavelength of the heating laser light and that of the laser light for interferometry, it is possible to effect interferometry simultaneously with heating. Hence, it becomes possible to make a residual stress measurement up to the boundary of a shift from the elastic deformation range to the plastic deformation range.

According to this second embodiment, as described above, heating up to the highest temperature in the elastic deformation range with laser light, it is possible to effect a non-destructive measurement without leaving any flaw or trace.

Moreover, a non-contact residual stress measurement can be done by interferometry.

Thus, the residual stress measuring system of this second embodiment is small-sized, superior in portability, and permits the measurement of residual stress even when the object to be inspected is large-sized or is difficult to move wholly or partially.

Next, with reference to FIGS. 11 and 12, a description will be given below about the construction and operation of a residual stress measuring system according to a third embodiment of the present invention.

First, the construction of the residual stress measuring system of this embodiment will be described with reference to FIG. 11.

Figure 11:
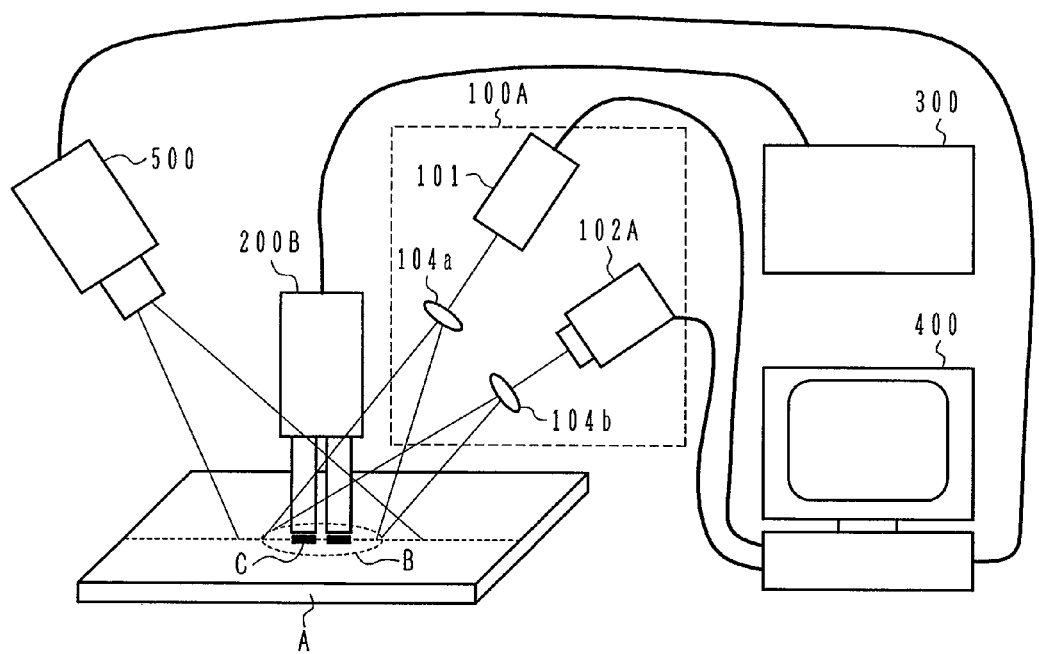
FIG. 11 is a construction diagram of a residual stress measuring system according to a third embodiment of the present invention.

FIG. 11 is a construction diagram of the residual stress measuring system according to this third embodiment. The same reference numerals as in FIGS. 1 and 6 represent the same portions as in those figures.

The residual stress measuring system of this third embodiment includes a laser interferometer 100A, a heater 200B, a controller 300, a data processor 400 and a temperature measuring device 500.

The heater 200B is, for example, a contact type heater and has a contact portion shape conforming to the shape of the heating area C. In the case of a contact type, when laser interferometry is performed, it is impossible to measure a shaded portion and a contacted portion. If deformation around the contacted portion is measured by using a structure which minimizes a shaded portion or if measurement is made upon removal of the heater after heating, it is possible to make a residual stress measurement as is the case with laser heating.

Now, with reference to FIG. 12, a description will be given below about a residual stress measuring method (a method of making measurement upon removal of the heating apparatus after heating) using the residual stress measuring system of this embodiment.

Figure 12:
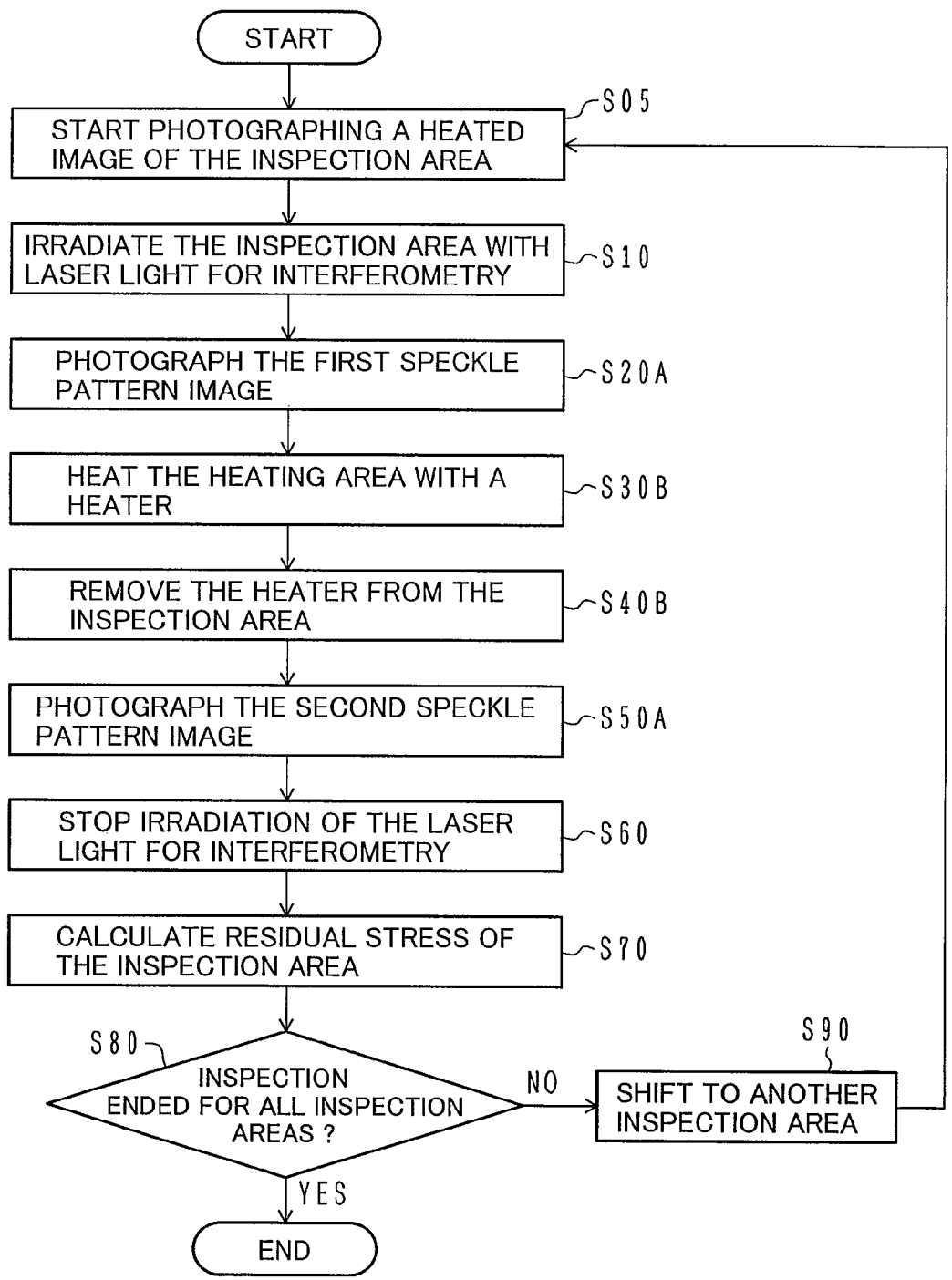
FIG. 12 is a flow chart showing residual stress measuring steps in a residual stress measuring method using the residual stress measuring system according to the third embodiment.

FIG. 12 is a flow chart showing residual stress measuring steps in the residual stress measuring method using the residual stress measuring system of this third embodiment. The same step numbers as in FIGS. 2 and 10 represent the same processings as in those figures.

First, in step S05, the temperature measuring device 500 starts measuring the temperature of the inspection area B.

Then, in step S10, the laser interferometer 100A irradiates the inspection area B with laser light for interferometry, then in step S20A, makes interferometry and photographs a first speckle pattern image of the inspection area.

Next, in step S30B, the controller 300 controls the heater 200B to heat the heating area C. At this time, with reference to data of a yield stress which is determined by the material of the object A to be inspected, the heating temperature is determined so that the resulting elastic deformation falls under an elastic deformation range not larger than the yield stress.

Then, in step S40B, the controller 300 terminates the heating operation of the heater 200B after the temperature of the inspection area has risen to a predetermined temperature. At this time, the controller 300 takes in a temperature change in real time from the temperature measuring device 500, then makes reference to the data on yield stress which is determined by the material of the object A to be inspected. Upon arrival at a certain preset temperature within the elastic deformation range, the controller 300 stops heating and removes the heater from the inspection area. Immediately after that, in step S50A, the laser interferometer 100A makes interferometry and photographs a second speckle pattern image of the inspection area.

Further, in step S60, the controller 300 stops the emission of the laser light for interferometry by the laser interferometer 100A.

Next, in step S70, the data processor 400 calculates a total deformation quantity from the difference between the interferometry of the inspection area position measured in step S20A and that measured in step S50A, then subtracts the deformation quantity induced by thermal strain from the total deformation quantity and calculates a deformation quantity induced by residual stress. Since the deformation quantity induced by residual stress is determined by the product of the difference between Young's modulus before heating and that after heating and the residual stress in accordance with Hooke's Law, the value of residual stress is obtained eventually. For a concrete example of step S70, a detailed description will be given with reference to FIGS. 3A and 3B and subsequent figures.

Next, in step S80, when the inspection area is not a single area, a check is made to see if measurement has been completed for all the inspection areas. If the answer is negative, then in step S90, the same measurement is made for the next inspection area.

In the description given above in connection with FIG. 10, heating and interferometry are divided from each other. Since the heating uses laser light, if color not overlapping each other, for example red color and green, are selected as the wavelength of the heating laser light and that of the laser light for interferometry, it is possible to make interferometry simultaneously with heating. Hence, it becomes possible to effect a residual stress measurement up to the boundary of a shift from the elastic deformation range to the plastic deformation range.

According to this third embodiment, as described above, heating up to the highest temperature in the elastic deformation range with laser light, it is possible to make a non-destructive measurement without leaving any flaw or trace.

Besides, a non-contact residual stress measurement can be done by interferometry.

Thus, the residual stress measuring system of this third embodiment is small-sized, superior in portability, and permits the measurement of residual stress even when the object to be inspected is large-sized or is difficult to move wholly or partially.

Further, according to this third embodiment, it is possible to synchronize heating with measurement in a non-contact manner and measure a heat-induced deformation process in real time, so that the maximum strain can be created within the elastic deformation range and the resolution of the residual stress measurement can be improved.

Figure 13:
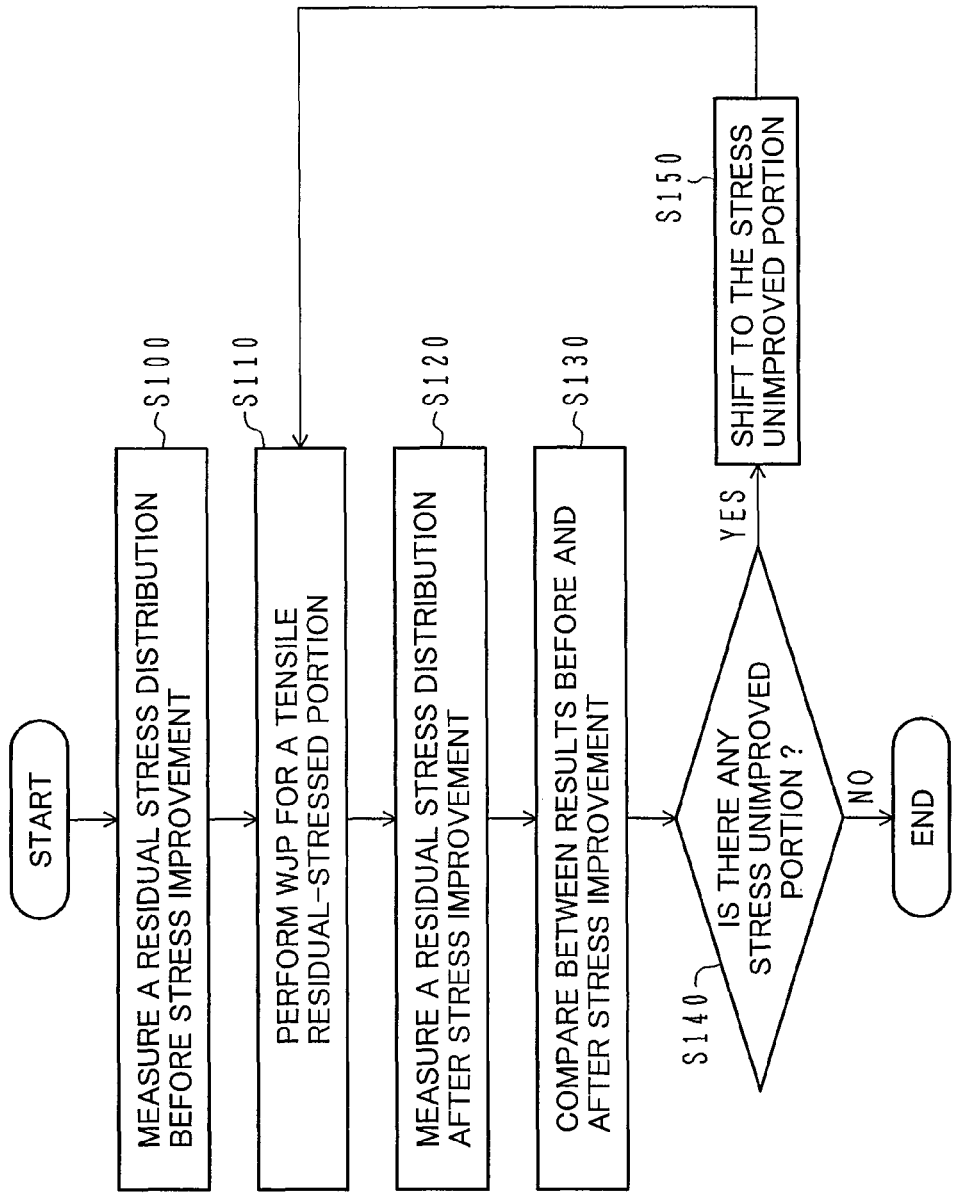
FIG. 13 is a flow chart showing the contents of a residual stress measuring method at the time of stress improvement by WJP according to a fourth embodiment of the present invention.

Next, with reference to FIG. 13, the following description is provided about a residual stress measuring method in stress improvement by WJP (Water Jet Peening) according to a fourth embodiment of the present invention.

FIG. 13 is a flow chart showing the contents of the residual stress measuring method in stress improvement by WJP according to the fourth embodiment.

First, in step S100, a residual stress distribution before stress improvement is measured by using the residual stress measuring system shown in FIG. 1, 6, or 11 and in accordance with the process shown in FIG. 2, 10, or 12.

Next, in step S110, WJP is performed for a portion found to be tensile residual-stressed or a portion likely to be so stressed, thereby making stress improvement.

Thereafter, in step S120, a residual stress distribution is again measured as in step S100.

Further, in step S130, a comparison is made between the result obtained in step S100 and that obtained in step S120. Then in step S140, it is determined whether there is a stress unimproved portion or not, and if the answer is affirmative, WJP is again performed for that portion in step S150.

According to this fourth embodiment, stress improvement can be done while checking whether residual stress is present or not.

What is claimed is:

1. A residual stress measuring method for measuring residual stress of the surface of an object to be inspected, the method comprising the steps of:
   heating an inspection area on the surface of the object to be inspected sufficiently for the surface to enter into an elastic deformation range therefor;
   irradiating the heated inspection area with laser light for interferometry and measuring a deformation quantity for the surface within the elastic deformation range upon stress relief by heating in accordance with a laser interferometric method; and
   measuring residual stress from the deformation quantity within the elastic deformation range upon stress relief of the object to be inspected by using a change of Young's modulus due to a rise in heat from before said heating to after said heating.

2. The residual stress measuring method according to claim 1, wherein, when measuring residual stress from the deformation quantity within the elastic deformation range, a deformation quantity induced by a thermal strain resulting from heating is subtracted from the total deformation quantity resulting from heating to determine a deformation quantity based on stress relief and residual stress is measured from the deformation quantity thus determined.

3. The residual stress measuring method according to claim 2, wherein the deformation quantity induced by a thermal strain resulting from heating is determined beforehand from a thermal distribution obtained upon heating of the same material as the object to be inspected.

4. The residual stress measuring method according to claim 2, wherein, when the object to be inspected has a strain induced by stress in the measurement direction and there is no stress-induced strain in a direction orthogonal to the measurement direction, the deformation quantity induced by a thermal strain resulting from heating is determined by measuring a deformation quantity in the measurement direction of the object to be inspected and that in a direction orthogonal thereto by the laser interferometric method and then using the quantity measured in the orthogonal direction.

5. The residual stress measuring method according to claim 2, wherein the deformation quantity induced by a thermal strain resulting from heating is determined by heating a reference member which is of the same material as that of the object to be inspected and which is free of residual stress.

6. The residual stress measuring method according to claim 1, wherein an electronic speckle pattern interferometric method is used as the laser interferometric method.

7. The residual stress measuring method according to claim 1, wherein a laser shearography method is used as the laser interferometric method.

8. The residual stress measuring method according to claim 1, wherein the heating means is laser heating means.

9. The residual stress measuring method according to claim 1, wherein the shape of the heating portion in the surface inspection area is a linear shape.

10. The residual stress measuring method according to claim 1, wherein the shape of the heating portion in the surface inspection area is a divided linear shape.

11. The residual stress measuring method according to claim 1, wherein measurement is made before and after a residual stress relaxing process and a residual stress relaxing effect is determined from the difference between measurement results before and after the residual stress relaxing process.

12. The residual stress measuring method according to claim 1, wherein a change in temperature caused by heating is measured simultaneously with heating by an infrared imaging apparatus.

13. The residual stress measuring method according to claim 12, wherein strain is measured simultaneously with heating and residual stress is measured from a change of the strain relative to temperature.

14. A residual stress measuring system for measuring residual stress of the surface of an object to be inspected, the system comprising:

laser heating means for heating a surface inspection area of the surface sufficiently for the surface to enter into an elastic deformation range therefor;

interferometric laser light irradiating means for irradiating the inspection area which is heated by the laser heating means with laser light for interferometry and measuring a deformation quantity for the surface within the elastic deformation range upon stress relief by heating in accordance with a laser interferometric method; and data processing means for measuring residual stress from the deformation quantity within the elastic deformation range upon stress relief of said object to be inspected by using a change of Young's modulus due to a rise in heat from before said heating to after said heating.

* * * * *